United States Patent
Wrue et al.

[11] Patent Number: 6,143,210
[45] Date of Patent: Nov. 7, 2000

[54] AUTOMATED CAST MOLD HYDRATING DEVICE

[76] Inventors: Richard J. Wrue, 93 Red Rock Rd.; Jeffrey Ange, 391 Browncroft Blvd., both of Rochester, N.Y. 14609; Otto X. Zettl, 9350 Keuka Highland Dr., Hammondsport, N.Y. 14840; James Blythe, 22 Nunda Blvd., Rochester, N.Y. 14610; Theresa Dengler, 215 Longview Dr., Webster, N.Y. 14580

[21] Appl. No.: 09/140,925
[22] Filed: Aug. 27, 1998
[51] Int. Cl.[7] .................................................. B29D 11/00
[52] U.S. Cl. ........................................... 264/1.36; 264/2.6
[58] Field of Search ........................... 264/1.1, 2.6, 1.36, 264/1.38; 425/808

[56] References Cited

U.S. PATENT DOCUMENTS

| | | | |
|---|---|---|---|
| 4,487,905 | 12/1984 | Mitchell . | |
| 5,080,839 | 1/1992 | Kindt-Larsen | 264/2.6 |
| 5,094,609 | 3/1992 | Kindt-Larsen | 425/445 |
| 5,264,161 | 11/1993 | Druskis et al. | 264/2.6 |
| 5,271,875 | 12/1993 | Appleton et al. | 264/2.3 |
| 5,387,404 | 2/1995 | Kutner et al. . | |
| 5,476,111 | 12/1995 | Anderson et al. | 134/58 |
| 5,542,978 | 8/1996 | Kindt-Larsen | 118/256 |
| 5,561,970 | 10/1996 | Edie et al. | 53/473 |
| 5,616,184 | 4/1997 | Duncan et al. | 134/22.1 |

FOREIGN PATENT DOCUMENTS

| | | | |
|---|---|---|---|
| 561 480 | 9/1993 | European Pat. Off. | 264/2.6 |
| 0 806 286 | 8/1996 | European Pat. Off. . | |
| 0824063 A2 | 2/1998 | European Pat. Off. | B29D 11/00 |

Primary Examiner—Mathieu D. Vargot
Attorney, Agent, or Firm—Mary Anne Magee

[57] ABSTRACT

A method for processing a cured contact lens wherein the contact lens is hydrated while retained in the mold cavity in which it was cast. The lens is released from the mold with cured excess lens material remaining with the mold.

13 Claims, 8 Drawing Sheets

AUTOMATED CAST MOLD HYDRATING DEVICE

BACKGROUND OF THE INVENTION

The present invention pertains to a method of hydrating and releasing a contact lens from the mold section in which it was molded.

Soft contact lenses are produced by a number of methods including static cast molding, spincasting, and combinations thereof. Two-part molds are commonly used in cast molding procedures, whereas spincasting involves the use of a single mold. In all cases where the lens is cast in a mold, it is important to recover the lens without damaging the lens.

As an example, U.S. Pat. No. 5,271,875 discloses a method of cast molding lenses in a mold assembly composed of anterior and posterior mold sections. The method involves filling the anterior mold with monomer mixture, assembling the anterior and posterior sections, clamping them together, curing the monomer to form a lens, disassembling the mold sections, recovering the lens, and hydrating the lens to form a hydrogel lens. This patent also discloses that it is advantageous to ensure that the lens is selectively retained on one of the mold sections.

U.S. Pat. No. 5,271,875 illustrates two general methods of recovering the lens. In both methods, one of the anterior and posterior mold sections is removed, with the lens remaining with the other mold section. First, in a "dry release" process, the lens is disengaged from the mold section in which it is retained by a force applied by a mechanical fixture. Second, in a "wet release" process, the lens is hydrated to facilitate its removal from the mold section in which it is retained. More specifically, as the lens absorbs water, the cured lens material expands sufficiently to disengage from this mold section.

U.S. Pat. No. 5,264,161 also discloses a "wet release" method of recovering a lens. In this method, a contact lens and the mold in which it is retained (preferably the lens being retained in both the anterior and posterior mold sections) is added to an aqueous bath, whereby the lens is hydrated and released from the mold. U.S. Pat. No. 5,264, 161 further teaches the advantage of adding a surfactant to this aqueous bath to facilitate release of the lens.

A drawback of dry release methods is that unless proper adjustment and operation of the mechanical release fixture is maintained, there is a high likelihood that the lens will be damaged. A drawback of wet release methods is that they may not adequately disengage the lens from the mold surface, thus requiring manual handling or resulting in damage to the lens when attempting to remove the lens from the mold.

In cast molding lenses, it is common that, in addition to the cured lens, there occurs excess cured lens material. This results from excess liquid monomer mixture being expelled from the lens cavity into an overflow. This excess monomer is then cured along with the lens. Frequently, this excess cured lens material has the form of a ring, formed around the cured lens. It is important that this excess cured lens material is separated cleanly from the lens. In the wet release process such as U.S. Pat. No. 5,264,161 employing an aqueous bath where the excess lens material is hydrated along with the lens, it becomes necessary to ensure that this excess cured lens material does not adhere to the hydrated lens. This is a particular problem since the lens and excess lens material tend to adhere to each other when hydrated.

This invention provides an improved process for hydrating and releasing a contact lens from the mold in which it is retained, offering less occurrence of damaged lens and ensuring that the lens is recovered separately from any excess cured lens material.

SUMMARY OF THE INVENTION

The present invention relates to an automated method of hydrating a contact lens while it is in the mold in which it was cast. The present invention relates to an improved method for releasing a contact lens from the mold in which it was cast. The present invention further reduces or eliminates the incidence of excess cured lens material that is attached to the lens as the lens is hydrated and released from the mold.

DETAILED DESCRIPTION OF THE INVENTION

Figure 1:
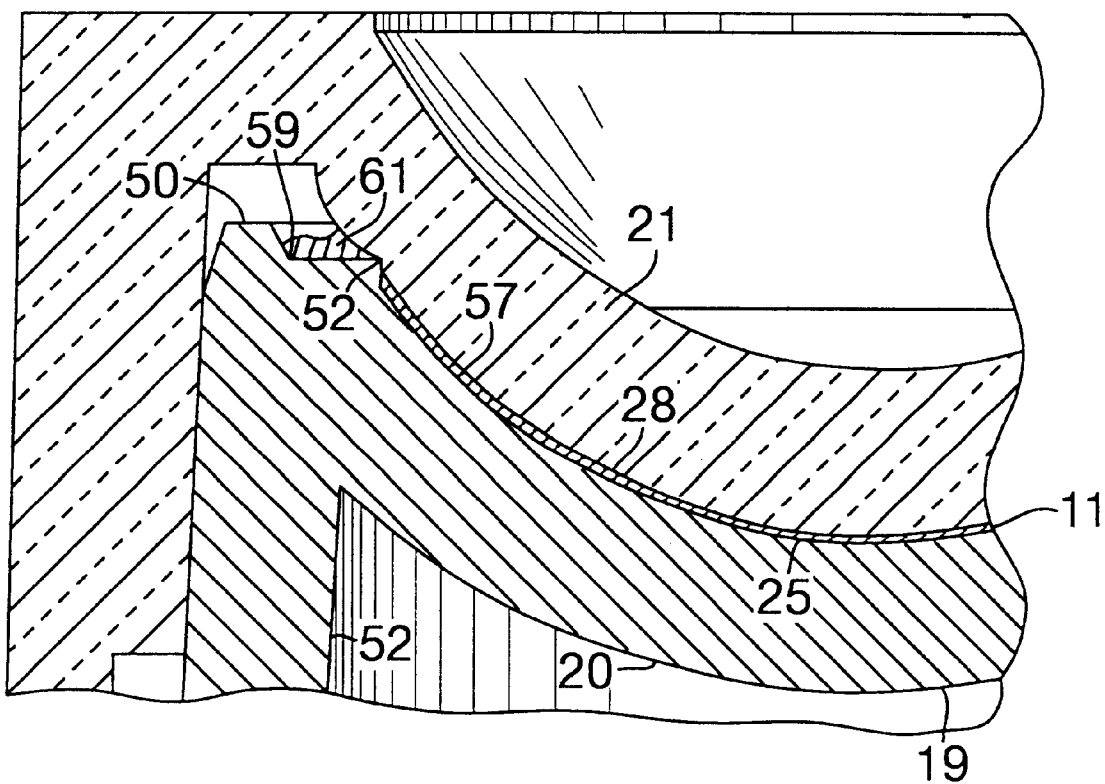
FIG. 1 is a cross-sectional view of assembled posterior and anterior mold sections of FIG. 2.
Figure 2:
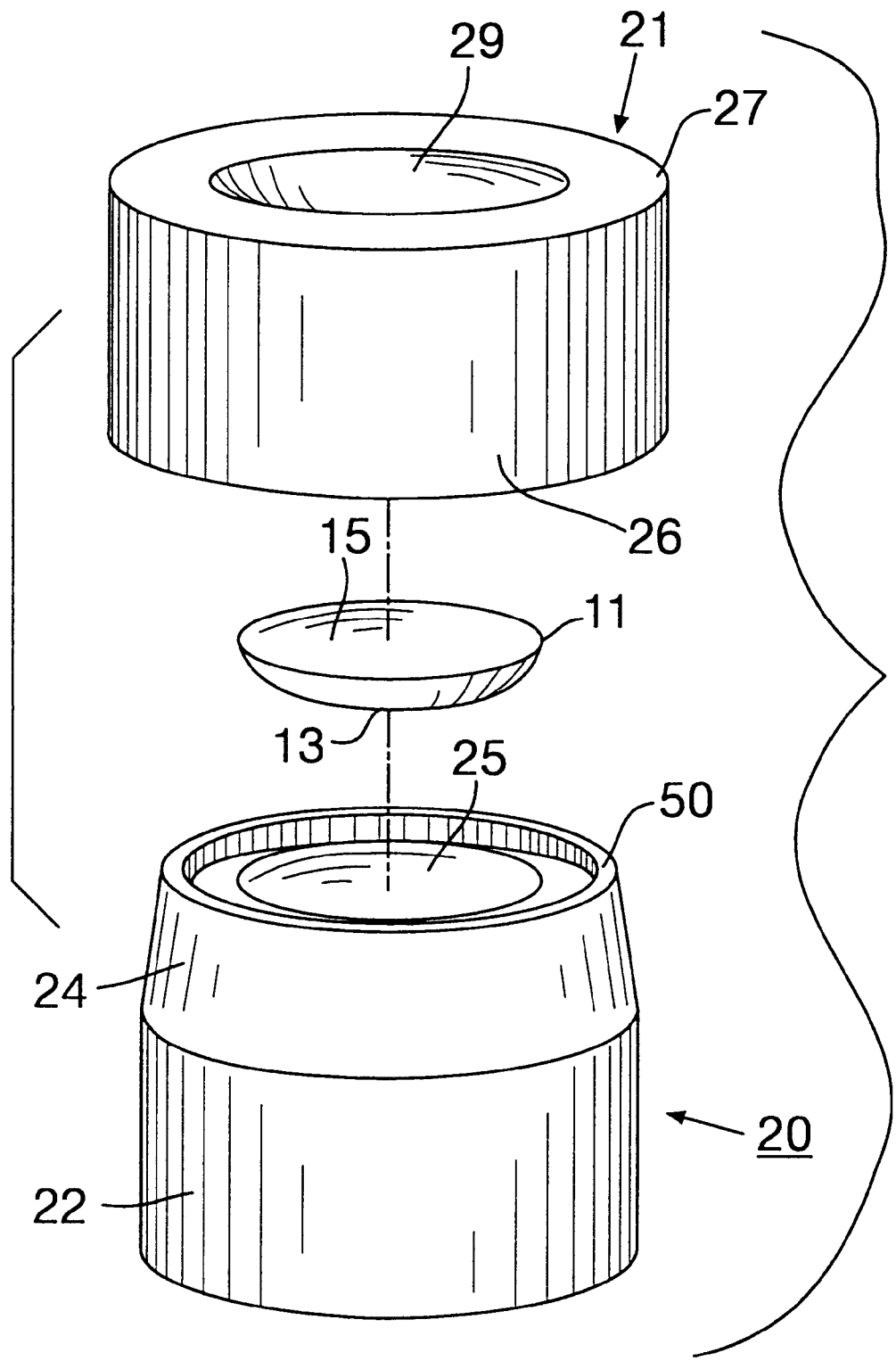
FIG. 2 is a schematic exploded view of a mold assembly and contact lens suitable for this invention.

FIG. 1 and 2 illustrate representative mold assemblies for cast molding of contact lenses. The assembly includes anterior mold section 20, including surface 25 for forming the anterior surface 13 of lens 11, and posterior mold section 21 including surface 28 for forming the posterior surface 15 of lens 11. Anterior mold 20 includes cylindrical base 22, tapered head 24, collar 50, rim 52 and anterior mold cavity defining surface 25. Reverse surface 56 of the anterior mold generally follows the contours of cylindrical base 22 and reverse side 19 generally follows the anterior mold cavity defining surface. The posterior mold 21 includes cylindrical shell 26, top flat 27 and reverse side 29 of the posterior mold cavity defining surface. For the illustrated embodiment, cylindrical shell portion 22 of anterior mold section 20 is received in cylindrical shell portion 26 of posterior mold section 21. It is understood, however, that the invention is applicable to other mold assemblies and mold section configurations. Other examples of applicable casting methods include static casting and spin casting or other single mold methods.

The molds parts may be made from any material conventionally used to cast hydrophilic contact lenses, including plastic materials such as polyethylene, polypropylene, polystyrene and polyvinyl chloride.

FIG. 1 illustrates posterior mold section 21 assembled with respect to anterior mold part 20, following introduction of lens-forming monomer mixture used to form lens 11. More specifically, typically, a lens-forming mixture is introduced onto upper surface 25 of anterior mold section 20, posterior mold section 21 is assembled with respect to the anterior mold section, and the mold sections are brought fully together to assume the configuration shown in FIG. 2. As seen in FIG. 2, when the mold sections are brought together, excess monomer mixture 61 is received and retained in receptacle 59 located around the perimeter of the molding cavity formed between surfaces 25, 28. After curing the lens-forming monomeric mixture in mold cavity 57 to form lens 11, the posterior mold is removed leaving lens 11 and cured excess lens material in receptacle 59 with the anterior mold. (While the illustrated embodiment illustrates a two-part mold assembly used for cast molding lenses, a single anterior mold section would be used to hold the lens-forming mixture in the case of casting the lens by spincasting.)

Figure 3:
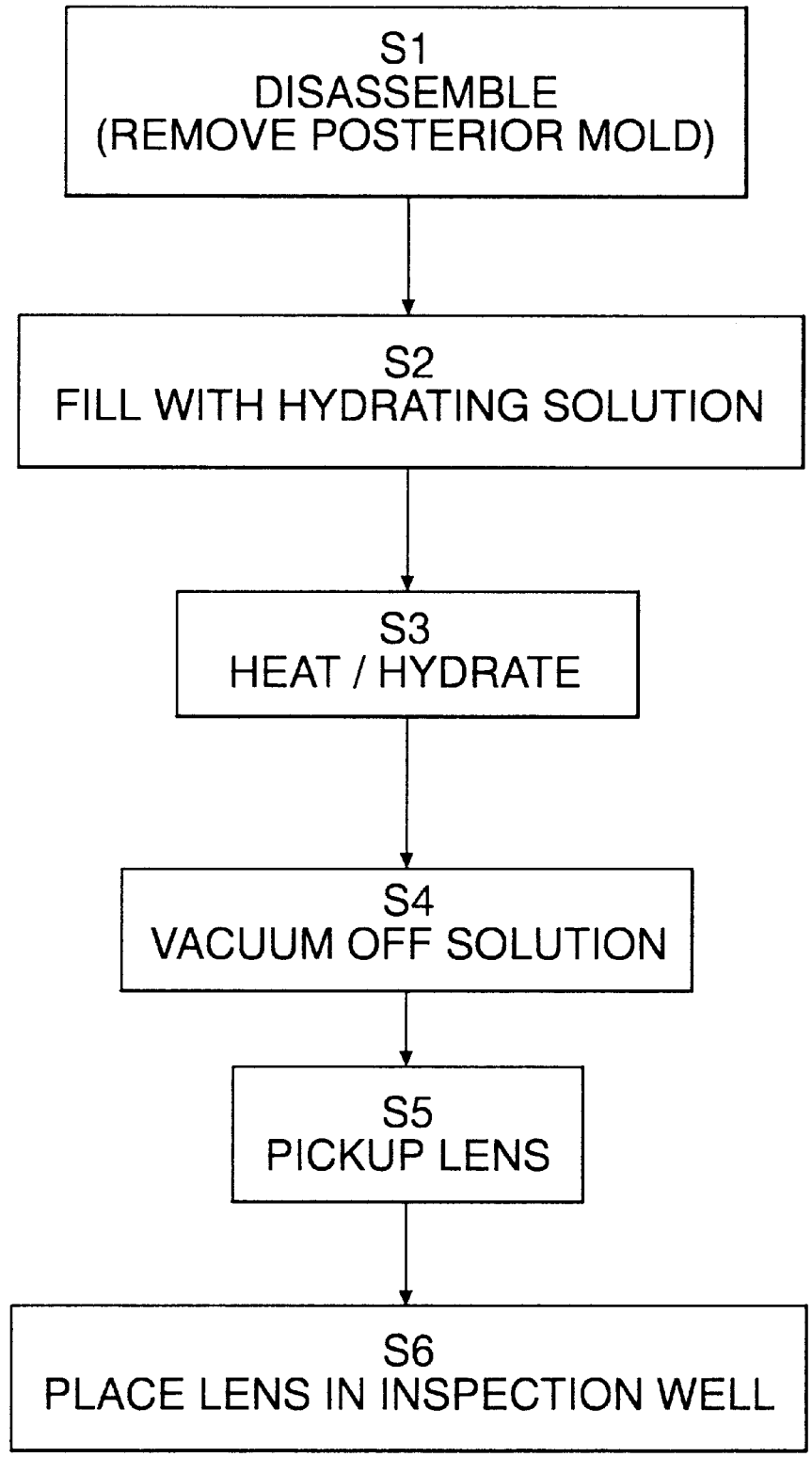
FIG. 3 is a flow diagram useful for explaining a lens hydrating method according to this invention.

FIG. 3 shows a flow diagram explaining a lens hydrating method according to this invention.

In step S1, the posterior and anterior molded surfaces are disassembled. As the cured lens has greater affinity for anterior mold 21, cured lens 11 as well as excess lens material 61 remains with the anterior mold.

As previously stated, lenses may be formed by other methods, such as single mold methods where the lens remains in the mold. Beginning with step S2, the anterior mold with the lens is placed on an automated transport belt that moves it through a series of stations. At the first station, the lens is filled with a hydrating solution. In step S3, the next station, the lens is exposed to a heat source. This occurs over a period of time with the transport belt slowly indexing, keeping the lens at a certain distance from the heat source. Steps S4 and S5 occur at the third station. The lens is then transported to the inspection tray of step S6 which is located at the fourth station.

The following discussion of FIGS. 4–8 will further detail the method described by FIG. 3.

Figure 4:
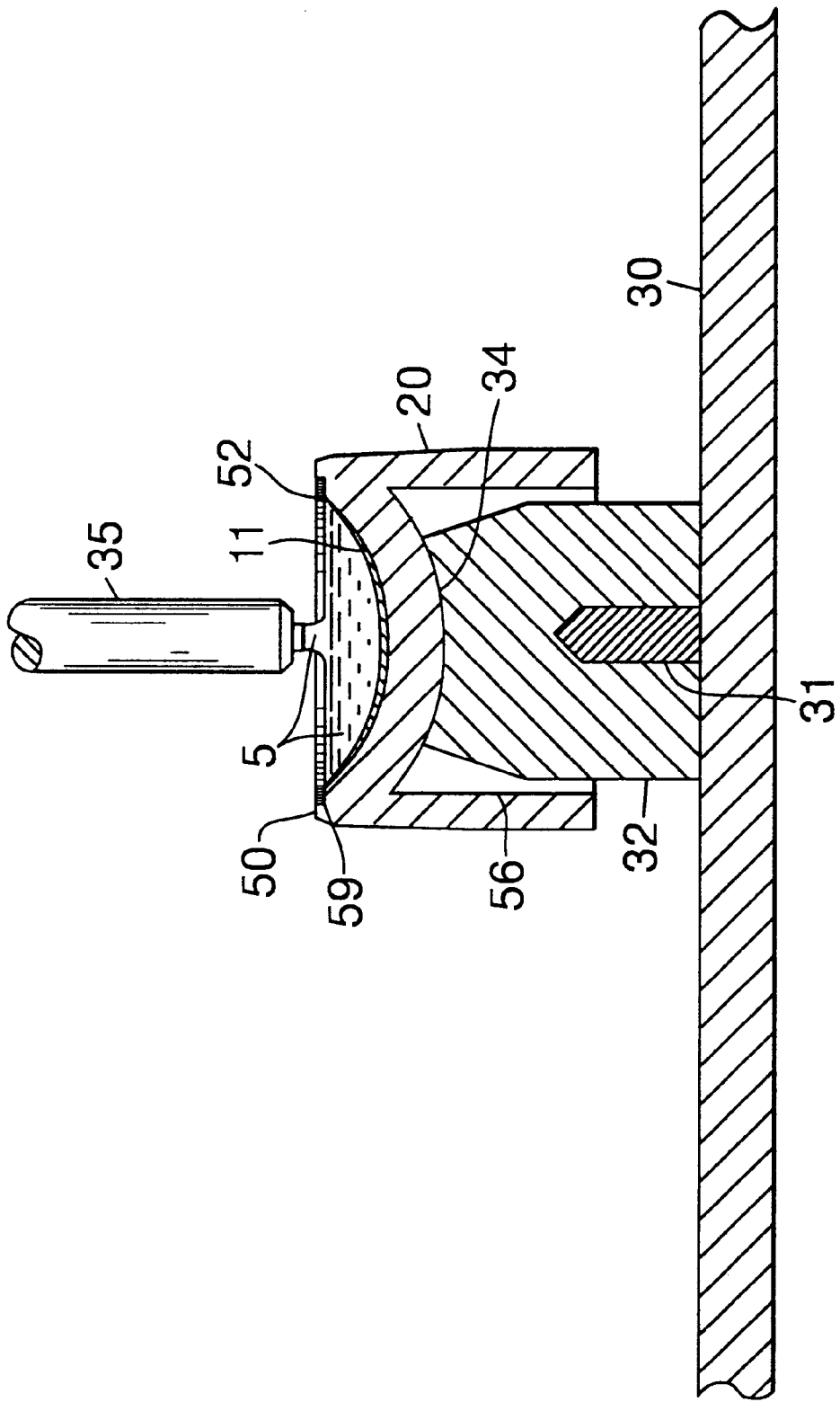
FIG. 4 is a partially cross-sectioned view of the solution dispensing station for an individual lens.

FIG. 4 which illustrates S2 shows a cross-section detail of the solution dispensing station of this invention where lens 11 is now retained, along with excess lens material, on anterior mold 20. For the illustrated embodiment, anterior mold 20 is supported on and positively driven by an automated transport belt 30 by positioning the mold onto mold holder pin 32. Pin 32 securely rests on nub 31 which is attached to belt 30. Pin 32 is slightly smaller than the interior diameter of the mold and has top surface 34 which is concave. This allows the mold to loosely fit on the pin and to have a slight rocking movement when contacting lower mold surface 19. Alternately, pin 32 can be shaped as to contain a point on the top surface. It will be appreciated that other mechanisms for transporting the mold/lens assemblies are within the scope of the invention At a first station located along conveyor 30, a predetermined amount of hydrating fluid 5 is dispensed on the concave surface of the contact lens by injector pump 35. Ideally, the amount of hydrating fluid dispensed by pump 35 at station 1 is such that the solution meniscus barely exceeds rim 52 of the anterior mold, i.e., excess fluid does not spill into receptacle 59. While a minor amount of fluid may flow into receptacle 59, it is intended to avoid a sufficient amount of fluid flowing into receptacle 59 whereby the ring of excess lens material 61 would become fully hydrated along with lens 11. On the other hand, the hydration fluid should fully cover lens 11 including the edge thereof, so that the lens edge is fully hydrated to avoid the likelihood of the lens edge remaining adhered to mold surface 25. Accordingly, several drops of the hydrating fluid is dispensed into the center of the unhydrated lens retained in mold 20, such that a meniscus is formed just covering the lens edge but preferably not encroaching onto the receptacle area. The hydrating fluid may be fluids conventionally used for hydrating soft, hydrogel contact lenses, including water or saline solution optionally including a surfactant such as Tween-80 surfactant.

Figure 5:
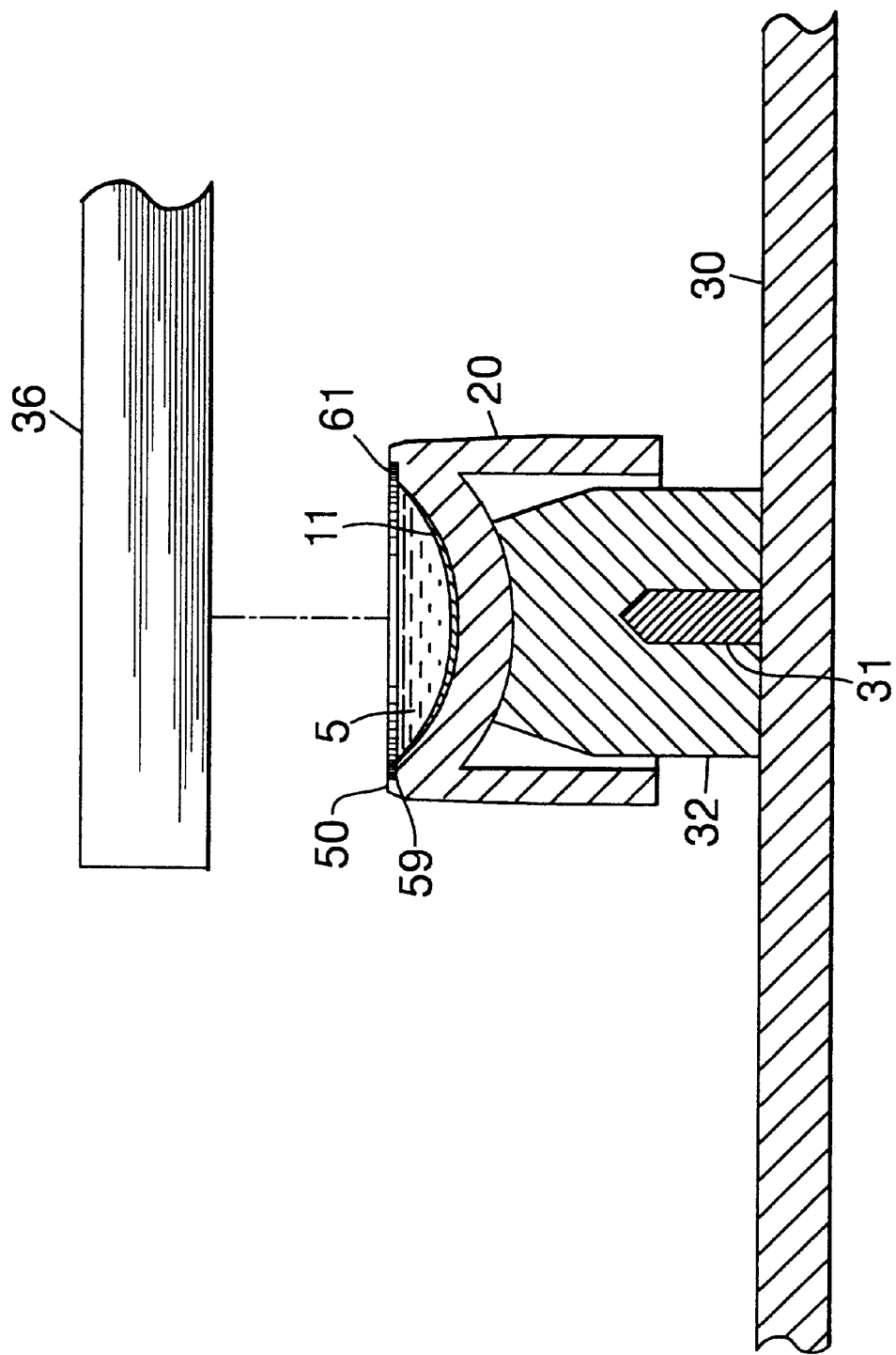
FIG. 5 is a partially cross-sectioned view of an individual lens at the heating station.
Figure 6:
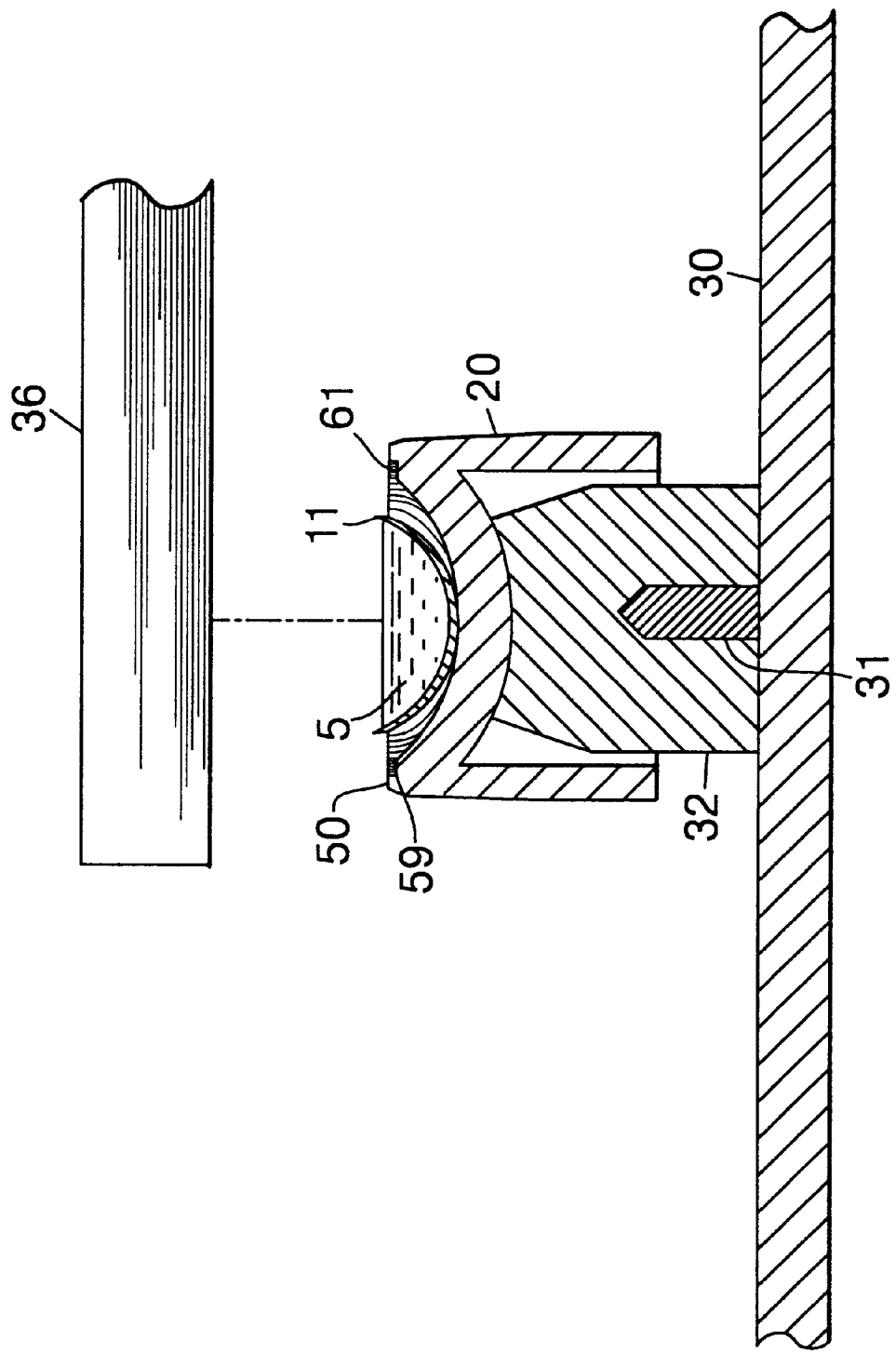
FIG. 6 is a partially cross-sectioned view of a hydrated lens at the heating station.

S3 begins with FIG. 5 and ends with FIG. 6. The anterior mold with lens 11 is transported along conveyor 30 to a second, downstream station as shown in FIG. 5. At this station, the hydrated lens is exposed to heat source 36. Any appropriate heat generating system such as a source of microwaves, may be used, however, the preferred heat source is an infrared panel. As an example, in the case where the lenses are formed of polymacon (a crosslinked copolymer formed primarily of 2-hydroxyethylmethacryalte), the lenses are exposed to the infrared light source for about 7 to 25 minutes; the infrared lamp being located approximately 3 inches from the top of the anterior mold. The heat from this lamp brings the hydrating fluid up to a temperature suitable to hydrate the lens. The main purpose of the heat source is to accelerate hydration of the lens. Although the lens would eventually hydrate at room temperature when immersed in the hydration fluid, application of heat to the lens and hydration fluid accelerates hydration of the lens. A suitable temperature for the hydrating fluid used to hydrate a polymacon lens is 145°+/−20° F. Accordingly, the heat source and position thereof is selected so that hydration of the lens is completed before lens 11 and mold 20 reach the following station on conveyor 30. On the other hand, if the temperature of the hydrating fluid becomes too high or if the lens is exposed to the heat for too long a time, evaporation will occur leaving the lens unhydrated.

If excess lens material 61 has become partially hydrated, it is during the heating process that the material will dry out and could adhere to the mold.

The anterior mold 20 with lens 11 is then indexed along conveyor 30 to a third station, downstream of the heating station, as seen in FIG. 6. By the time the lens and mold reach this station, the lens has been hydrated and separates from the anterior mold. At this point, edges of lens 11 have gently pulled away from anterior mold surface 25. The hydrated lens additionally has increased in size and no longer fits into the mold cavity. The ring of excess cured lens material 61 remains in receptacle 59 preferably unhydrated and adhered to mold 20.

Figure 7:
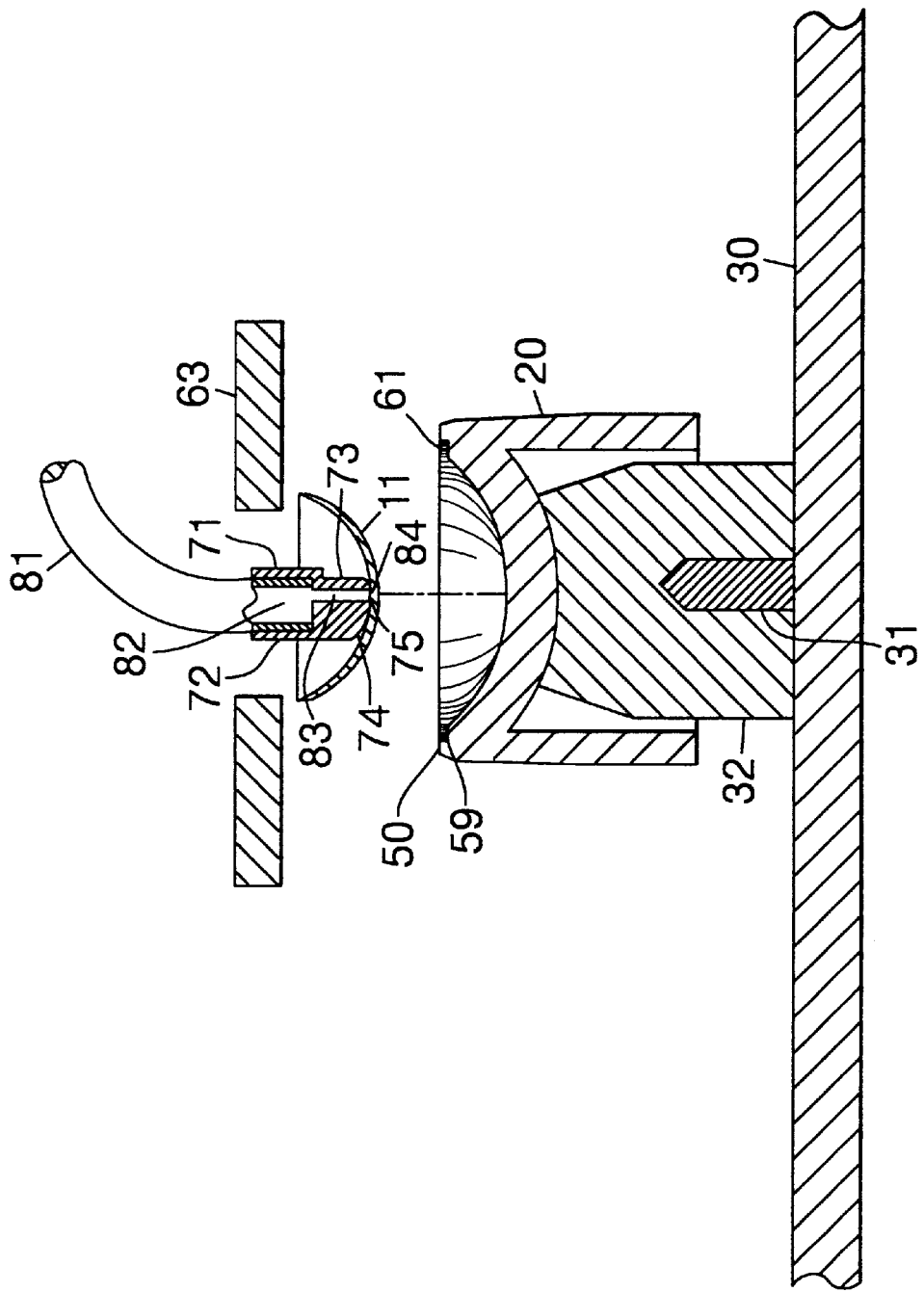
FIG. 7 is a partially cross-sectioned view of the hydrated lens as it is removed from the posterior mold.

At this station in S4, collar 50 is indexed under the fixed mold retaining plate 63 and nozzle element 71 as shown in FIG. 7. Nozzle element 71 includes a body portion 72 and a head portion 73. In the preferred embodiment, the head portion of nozzle 71 has a section which has been cut away. Surface 74 formed at the end of the head portion has a partial spherical surface. This aids in removal of the lens from the anterior mold. Vacuum source 81, connected to central passage 82 extends through the body portion and connects with nozzle head passage 83. Nozzle head passage 83 forms opening 75 in nozzle head surface 74. Surface 74 is generally spherical to conform to the posterior surface 15 of lens 11 and anterior mold cavity defining surface 25. Screen 84 is positioned in opening 75.

Accordingly, nozzle 71 is lowered towards the anterior mold until it contacts the surface 15 of hydrated lens 11. As nozzle 71 is lowered, a vacuum is applied through tube 81. The vacuum source pulls through central passage 82 and nozzle head passage 83. As the nozzle head portion 73 contacts hydrating solution 5, the solution is pulled up into the nozzle passageways toward the vacuum. Nozzle head surface 74 then contacts lens surface 15. The nozzle head surface aligns itself to the curvature of the mold cavity surface 25 which may cause mold 20 to slightly rock on pin 32. This allows the nozzle head to become centered on lens surface 15. As the vacuum from nozzle head 73 begins to pulls on lens 11 the rocking movement of mold 20 adds friction further aiding in the dislodging of lens 11.

Screen 84 is included in the opening at nozzle head opening 75, permitting only the hydrating fluid to be evacuated through passage 83 while leaving the lens attached to the screen 84. Screen 84 prevents the hydrated lens from inadvertently being drawn into vacuum source 81. Nozzle element 71 and screen 84 are preferably made from materials which will not damage the lenses during this pick and place operation.

Nozzle element 71 is then raised, while maintaining the vacuum through passages 82 and 83, to lift the lens from the mold as shown in FIG. 7. Preferably, nozzle 71 is raised relatively slowly to allow the lens to peel away from the mold, with the weight of the mold assisting with this separation. It is noted that in some cases, the lens may not be fully disengaged from the mold, i.e., the weight of the mold does not facilitate full separation of the lens from the mold, whereby the mold is lifted along with the lens when nozzle assembly is raised. In such cases, the mold makes contact with fixed mold retaining plate 63 which serves to disengage the mold from the lens and the mold drops back onto pin 32 or is discarded by the transport belt.

Figure 8:
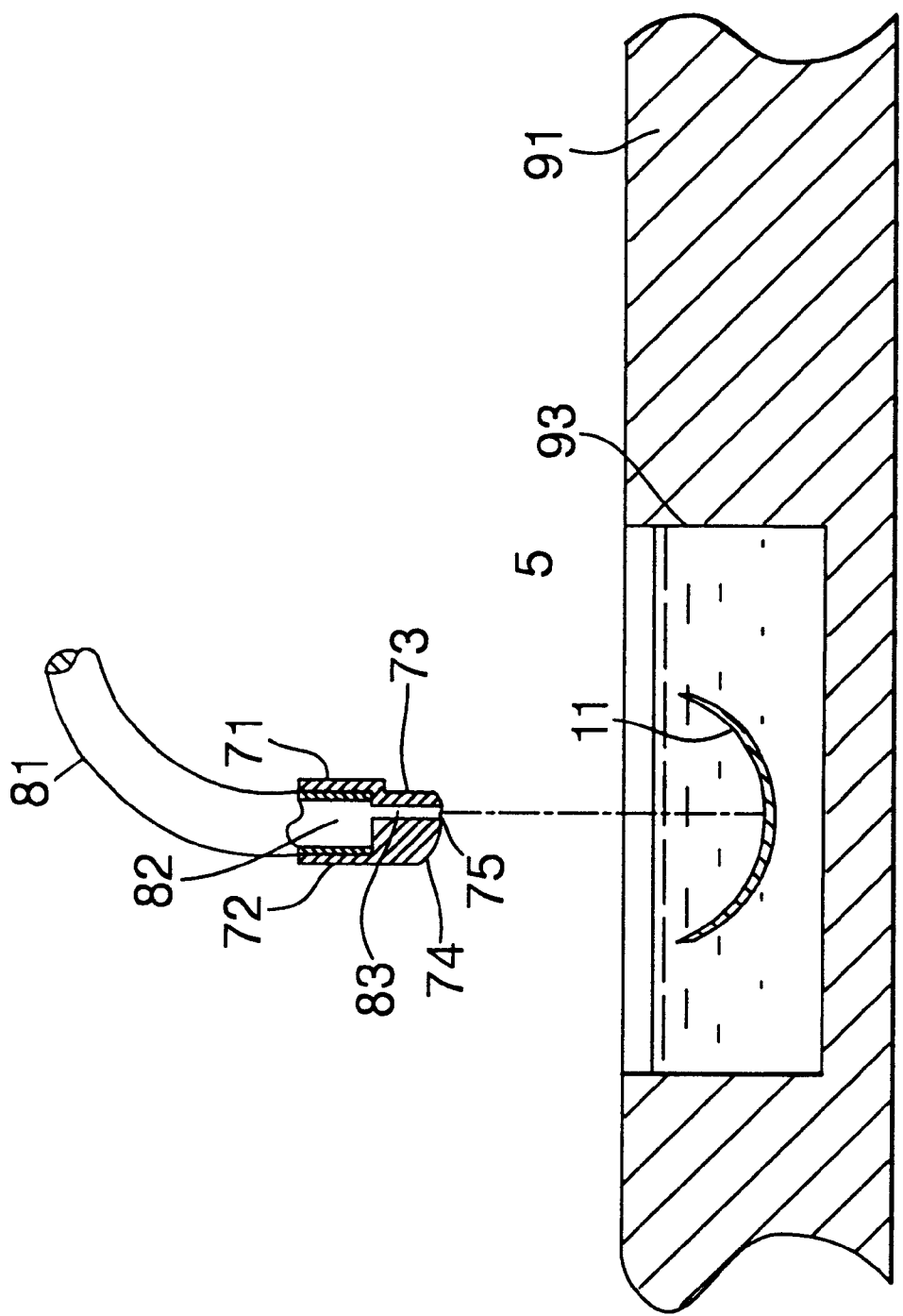
FIG. 8 is a partially cross-sectioned view of the lens placed in the inspection tray.

The nozzle carrying lens 11 is then moved to a station alongside conveyor, as seen in FIG. 8 (S6). At this station, the lens is released from the nozzle assembly into lens carrier 91. For the illustrated embodiment, carrier 91 is a tray including well 93 for holding and transporting the lenses for further processing. However, the carrier may have other configurations depending on the desired manufacturing, sequence, for example, nozzle 71 may deposit the lens directly in a contact lens blister package at this stage. In any event, after the lens is positioned above well 93, a switching valve (not shown) changes the vacuum in central passage 82 and head passage 83 of nozzle 71 to a low positive air pressure. For the illustrated embodiments well 93 of carrier 91 include a fluid such as water or aqueous solution.

While the nozzle assembly transfers the lens to carrier 91, mold 20, now lacking a lens but still including the ring of excess lens material 61, is indexed further along conveyor 30 until it reaches a discard station (not shown). At this station, the mold with the ring of material 61 is discarded; any remaining hydrating fluid in the mold may be discarded or, if desired, recovered and circulated through filters for recycling.

It has been found that a range of lenses with different power corrections can be hydrated using the described apparatus and method. The lenses were consistently removed from the mold without damage, and the annular ring of excess lens material consistently remained attached to the mold.

The foregoing has been provided so that the nature of the invention may be understood easily. It should, however, be apparent that modifications of the foregoing embodiments may be made without departing from the nature and scope of the invention. For example, it is possible to provide the unhydrated lens formed in a single mold process, i.e., spincasting, lathing and combinations of casting and lathing. Thus, the invention is applicable for other processes that cast a contact lens in a xerogel state and involve. hydration and release of the lens from a mold. Additionally, the invention is applicable to other casting processes that involve molds with shapes other than that described for the illustrated embodiment. Accordingly, the scope of the invention should not be limited to the specifics described above but instead should be measured with respect to the appended claims.

We claim:

1. A method of hydrating a cured lens retained in the mold cavity in which it was cast, said mold containing cured excess lens material receptacle adjacent to said mold cavity, comprising:

hydrating the lens while the lens is retained on the mold, while avoiding complete hydration of the cured excess lens material retained on the mold; and removing the hydrated lens from said mold with the excess lens material remaining with the mold.

2. The method of claim 1, wherein liquid is dispensed on the lens while the lens is retained on the mold.

3. The method of claim 2, wherein after dispensing liquid on the lens retained in the mold, the lens and liquid are exposed to a heat source.

4. The method of claim 3, wherein liquid is dispensed liquid on the lens retained in the mold at a first station along a conveyor, and the lens and mold are indexed to a second station along the conveyor for exposure to the heat source.

5. The method of claim 3, wherein said heat source comprises an infrared light source.

6. The method of claim 2, wherein said liquid is selected from water or an aqueous solution.

7. The method of claim 1, wherein the hydrated lens is removed from the mold with a nozzle assembly including a head portion for contacting the hydrated lens, and a passage extending through a body of the nozzle assembly, said central passage connected to a vacuum source.

8. The method of claim 6, wherein the nozzle assembly deposits the lens in a receptacle of a lens carrier.

9. The method of claim 7, wherein the passage of the nozzle assembly is also attached to a source of pressurized air, said nozzle assembly including a valve that deactivates the vacuum source and activates the pressurized air source to deposit the lens.

10. A lens molding method comprising:

curing polymerizable lens material to form a lens in a mold cavity formed between a first mold having a first lens molding surface and a second mold having an opposed lens molding surface, where excess polymerizable lens material is received and cured in a space adjacent an edge of the mold cavity;

removing the second mold section such that the cured lens and cured excess lens material remains on the first mold;

placing a liquid on the cured lens and hydrating the lens; and removing the lens from the first mold, whereby the cured excess lens material is not fully hydrated and remains on the first mold.

11. The method of claim 10, wherein the lens including dispensed liquid is subjected to a heat source prior to removing the lens from the first mold.

12. A method of hydrating a cured lens retained in the mold cavity in which it was cast, said mold containing cured excess lens material receptacle adjacent to said mold cavity, comprising:

dispensing liquid on the lens while the lens is retained on the mold, and exposing the lens and liquid to a heat source, thereby hydrating the lens and disengaging the lens from the mold; and removing the hydrated lens from said mold with the excess lens material remaining with the mold, wherein the cured excess lens material is not fully hydrated.

13. The method of claim 12, wherein said heat source comprises an infrared light source.

* * * * *

UNITED STATES PATENT AND TRADEMARK OFFICE
CERTIFICATE OF CORRECTION

| | | |
|---|---|---|
| PATENT NO. | : 6,143,210 | |
| DATED | : November 07, 2000 | |
| INVENTOR(S) | : Richard J. Wrue, Jeffrey Ange, Otto X. Zettl, James Blythe, Theresa Dengler, Steven B. Renner | |

It is certified that error appears in the above-identified patent and that said Letters Patent is hereby corrected as shown below:

<u>Title Page</u>
Item [76] under Inventors, add -- Steven B. Renner, 6 Old Acre Lane, Rochester, New York 14618 --.

Signed and Sealed this

Twenty-fifth Day of September, 2001

*Attest:*

Nicholas P. Godici

NICHOLAS P. GODICI
*Attesting Officer*    *Acting Director of the United States Patent and Trademark Office*